United States Patent Office 3,032,491
Patented May 1, 1962

3,032,491
IRRADIATION OF CYCLOHEXADIENONES
Derek H. R. Barton, London, England, and Gerhard Quinkert, Braunschweig, Germany, assignors to Polaroid Corporation, Cambridge, Mass., a corporation of Delaware
No Drawing. Filed July 22, 1959, Ser. No. 828,688
Claims priority, application Great Britain July 23, 1958
12 Claims. (Cl. 204—158)

This invention is concerned with a new process for the production of unsaturated hydrocarbon derivatives.

It has been found according to the invention that a novel diene acid or a derivative thereof of the formula:

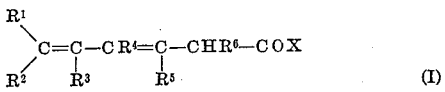  (I)

or

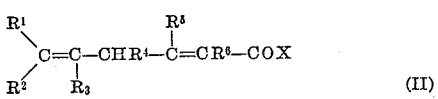  (II)

in which $R^1$, $R^2$, $R^3$, $R^4$, $R^5$ and $R^6$ are alkyl, alkoxy, acyl, alkenyl, aralkyl, aralkenyl or aryl groups or halogen or hydrogen atoms may be prepared by the irradiation with ultraviolet light in the presence of a nucleophilic reagent of the formula HX of a 6,6-disubstituted cyclohexadienone of the formula

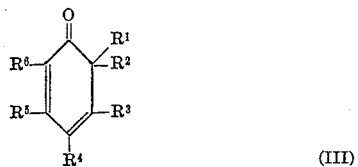  (III)

in which $R^1$, $R^2$, $R^3$, $R^4$, $R^5$ and $R^6$ may have the same meanings as above.

Reagents of formula HX which are suitable for use in the present reaction include water, primary and secondary amines, alcohols and acids. Thus when the reaction is carried out in the presence of water, a diene acid is formed whereas in the presence of an amine the corresponding amide is formed and in the presence of an alcohol, the corresponding ester.

Particular reagents which have been found suitable include water, aniline and cyclohexylamine.

The reaction according to the invention is preferably carried out in the presence of an inert solvent, e.g. ether. However, when the starting material is sufficiently soluble in the reagent HX a solvent will in general be unnecesary.

The quantity of water, amine or alcohol present in the reaction should, of course, preferably be at least stoichiometrically equivalent to the amount of cyclohexadienone, advantageously in considerable excess.

It is preferred to carry out the reaction in dilute solutions of the cyclohexadienone concentrations of the order of 0.1% often being found convenient.

In general it is advantageous if the irradiation is carried out in the absence of air in an atmosphere of an inert gas, for example, nitrogen.

The time of irradiation required for the reaction varies with the intensity and wavelength of the radiation, the quantity of the starting material and the absorption of the vessels containing the cyclohexadienone solution. However, since the U.V. absorption spectrum of the diene acid varies very considerably from that of the cyclohexadienone, the course of the reaction can easily be followed and be stopped when the U.V. absorption spectrum of the solution ceases to change or at a convenient subsequent time. For maximum efficiency of irradiation the vessels containing the solution should be of a substance which absorbs little U.V. radiation, for example, quartz rather than glass.

The wavelength of the radiation is advantageously that at which maximum absorption takes place by the cyclohexadienones; the light used should thus have substantial intensity at wavelengths between 250 and 500 m$\mu$, preferably around 300 m$\mu$.

The temperature of the solution does not appear to affect the course of the reaction and may be varied widely. It is generally convenient to irradiate at approximately room temperature or, sometimes, at the boiling point of the solution. Naturally the heating effect of the radiation tends to raise the temperature of the solution.

The 6,6-disubstituted cyclohexadienones used as starting materials may be prepared in any convenient manner. One method which is particularly suitable and which has rendered such 6,6-disubstituted cyclohexadienones generally available, is oxidation of phenols with lead tetraacetate by the method of Wessely (Monatsh. 1950, 81, p. 1066 and 1954, 85, p. 69).

It appears that the reaction passes through a ketene intermediate by a reversible electron rearrangement.

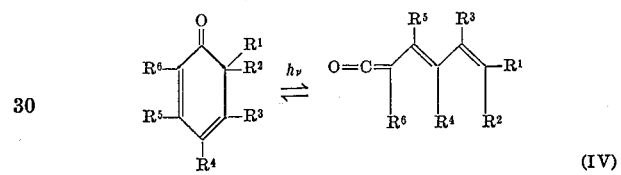  (IV)

The ketene compound IV then reacts with the nucleophilic reagent to form the diene acid I. In certain cases the form I of diene acid is isomerised into the acid II. This isomer is preferred when 1,3 interaction occurs between the group $R^4$ and $R^2$ or $R^6$ or both, the form II of the acid having such non-bonded interaction at a minimum.

It is also pointed out that when irradiating a compound of Formula III in which $R^4$ is a group other than hydrogen and $R^2$ and $R^6$ are groups which will interact with the group $R^4$ a strong nucleophilic reagent should be used. The trans form of ketene IV which reacts with the nucleophilic reagent is stereochemically unfavoured because of the 1,3 interactions and there is a high rate of back reaction to the starting material. A nucleophilic reagent should therefore be used which will react with the ketene at a higher rate than the rate of the back reaction. Cyclohexylamine has been found suitable as a nucleophilic reagent for use with such compounds.

The new diene acids and their carboxylic derivatives produced according to the present process are useful as intermediates in organic synthesis. Where one of groups $R^1$ and $R^2$ is an acyloxy group, acid or alkaline hydrolysis gives rise to an enolic hydroxyl group which rearranges to give an alpha:beta-unsaturated ketone. One particularly interesting synthesis made possible by the present process is the production of the carotenoid crocetin by irradiation of a 1,4-di-6-(1-keto-2,6-dimethyl-4-halo-cyclohexadiene-2,4-yl) but-2-ene in ether saturated with water, followed by dehydrohalogenation of the resulting dihalo dicarboxylic acid with, for example, collidine. Since the starting material may be prepared by reaction of a 2,6-dimethyl-4-halo-phenol with a 1,4-dihalo-but-2-one by the method of Curtin, Crawford and Wilhelm (J.A.C.S., 1958, 80, 1891) and since 2,6-dimethyl-4-halo-phenols are simply prepared by direct halogenation of the commercially available 2,6-dimethyl phenol, the process according to the present invention affords a particularly direct method of synthesising crocetin. In general, in fact, the process of the present invention represents a valuable new method of splitting the phenyl ring without resource to the rigorous treatment which is usually necessary.

The process also has photographic application as exposure of a compound of Formula III to ultraviolet light in the presence of water causes the formation of an acid which could be used to neutralise the alkaline developing agent and stabilise the image.

The structure of the new diene acids produced by the present process has been established by degradative experiments and by examination of the ultraviolet spectra of the compounds. Thus the cyclohexadienone of formula X in which $R^1$ is a methyl group, $R^2$ is an acetyloxy-group and $R^3$, $R^4$, $R^5$ and $R^6$ represent hydrogen atoms on irradiation gave a diene acid which on hydrogenation took up 2 mols. of hydrogen to give an oily tetrahydro-acid. Saponification of the acetyloxy group of this tetrahydro-acid and chromic acid oxidation of the resulting hydroxy acid gave a keto-acid which on methylation with diazomethane gave a keto acid ester characterised, by means of its 2,4-dinitrophenyl-hydrazone, as methyl 5-keto-hexane-1-carboxylate

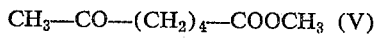

$$CH_3-CO-(CH_2)_4-COOCH_3 \quad (V)$$

(Schaeffer and Snoddy, Organic Syntheses, 1951, 85, 69.)

Since none of these steps would be expected to cause any re-arrangement of the molecule, the diene acid investigated must have possessed an acetyloxy group in place of the keto group of Formula V, a free carboxyl group in place of the ester group and two carbon-carbon double bonds.

The infra-red spectrum of the same diene acid corresponded exactly to that theoretically predicted from the postulated structure of the acid, showing, in particular that the double bonds were conjugated and that the acetyloxy group was enolic in nature.

The invention will now be illustrated by the following examples. The following general procedure was adopted:

The irradiations were carried out under oxygen-free nitrogen in a Pyrex flask by a mercury vapor lamp (250 w.) at the B.P. of the solvent. The flask was placed at 10 cm. from the light source. The concentration of the solutions used was between 0.1 and 1% in cyclohexadienone. Aliquots were removed at 30 min. (or shorter if more convenient) intervals for ultraviolet absorption measurement. When there was no further change the reaction mixture was irradiated for a further 30 mins. and then worked up. In every case a blank experiment was carried out at the same time under exactly the same conditions but without irradiation. It was shown by ultraviolet absorption measurements as well as by the appropriate isolation of starting material that in no case was there any chemical reaction from purely thermal causes. In each case the heat from the mercury lamp caused the ethereal solvent to reflux.

*Example I.—Irradiation of 6-Acetoxy-6-Methylcyclohexa-2,4-Dien-1-One in the Presence of Water*

The cyclohexadienone (1.24 g.) in ether (1240 ml.) previously saturated with water, was irradiated for three hours. The dried (MgSO$_4$) ethereal solution was evaporated and the residue crystallised twice from cyclo hexane to give 6-acetoxyhepta-3,5-dienoic acid.

Characteristics of crude product:
Yield 1.31 g.—93.5% theoretical
$\lambda$ max.=234.5 m$\mu$, $\epsilon$=23,400

Characteristics of purified product:
Yield 1.09 g.—79% theoretical
$\lambda$ max.=235 m$\mu$, $\epsilon$=23,800
M.P.=86–87° C.

*Analysis.*—Found: C, 58.95; H, 6.75. Required: C, 58.7; H, 6.55.

Infra-red spectrum (in CHCl$_3$) 3480 (monomeric hydroxyl group), 3440–2500 (associated hydroxyl of carboxylic acid group), 1748 (enolic acetate), 1726 (saturated carboxyl group) and 1677 and 1622 (conjugated ethylenic linkages) cm.$^{-1}$. Hydrogenation (2 mols. uptake) gave an oily tetrahydro-acid characterised as the p-bromophenacyl ester, M.P. 59–60° C. This ester analysed as follows:
Theoretical: C, 53.3; H, 5.5; Br. 20.75. Found: C, 53.55; H, 5.9; Br, 20.65.

The pure product on reaction with methanolic hydrochloric acid and 2,4-dinitrophenylhydrazine gave the 2,4-dinitrophenyl-hydrazone of 1-acetyl-4-carboxymethyl-but-1-one, M.P. 119–120° C., $\lambda$ max. (EtOH) 374 m$\mu$, $\epsilon_c$=26,800.

*Analysis.*—Theoretical: C, 50.00; H, 4.80; N, 16.66. Found: C, 50.19; H, 4.84; N, 17.13.

*Example II.—Irradiation of 6,6-dimethylcyclohexa-2,4-Dien-1-One*

6,6-dimethylcyclohexadienone (330 mg.) in ether (330 ml.) saturated with water was irradiated for 3 hours. The crude product (356 mg.—86.5% theoretical yield) was crystallised from light petroleum (B.P. 60–80°) and gave 6 methylhexa-3,5-dienoic acid (244 mg.—64% theoretical), $\lambda$ max. 238, $\epsilon_c$=23,500, M.P. 48–50° C.

*Analysis.*—Theoretical: C, 68.5; H, 8.6. Found: C, 68.3; H, 8.7.

Infra-red spectrum (in CCl$_4$) 3540 (monomeric hydroxyl group), 3400–2500 (associated hydroxyl of carboxylic acid group), 1733 (saturated carboxyl group) and 1677 and 1632 (conjugated ethylenic linkages) cm.$^{-1}$. It gave acetone (44%) on ozonolysis.

The p-bromphenacyl ester of the pure product was prepared, M.P. 108–108.5° C.

*Analysis.*—Theoretical: C, 57.0; H, 5.1; Br, 23.7. Found: C, 57.3; H, 5.5; Br, 23.9.

*Example III.—Irradiation of 6,6-Diacetoxy-4-Methyl Cyclohexa-2,4-dien-1-one*

The dienone (510 mg.) in ether (510 ml.) saturated with water was irradiated for 2.5 hours. The crude product had an ultraviolet absorption corresponding to a 93% yield. Crystallisation from light petroleum gave 6,6-diacetoxy-4-methylhexa-3,5-dienoic acid (319 mg.). M.P. 70–71° C., $\lambda$ max.=237 m$\mu$ ($\epsilon$=12,200).

*Analysis.*—Found: C, 54.9; H, 6.0. Required: C, 54.55; H, 5.85.

Infra-red spectrum in (CHCl$_3$) 3473 (monomeric hydroxyl group), 3400–2500 (associated hydroxyl of carboxylic acid group), 1770–1780 (enolic acetates), 1730 (saturated carboxyl group) and 1685 and 1628 (conjugated ethylenic linkage).

*Example IV.—Irradiation of 6-Acetoxy-6-Methyl Cyclohexa-2,4-dien-1-one in the Presence of Organic Bases*

(a) *Aniline.*—The dienone (543 mg.) and redistilled aniline (614 mg.) in dry ether (540 ml.) were irradiated for 100 mins. Removal of the excess of aniline by shaking with 4 N aqueous hydrochloric acid and working up in the usual way gave the anilide of 6-acetoxyhepta-3,5-dienoic acid. Purified by filtration in benzene solution over silica gel (5 g.) and crystallisation from aqueous ethanol this (670 mg.) had M.P. 105–106°, $\lambda$ max. 245 m$\mu$ ($\epsilon$=33,400), infra-red bands (in CHCl$_3$) at 3384 (secondary amide group, 1755 (enol acetate) and 1682 (anilide carbonyl) cm.$^{-1}$. (Found: C, 69.7; H, 6.7; N, 5.25. $C_{15}H_{17}O_3N$ requires C, 69.5; H, 6.6; N, 5.4%.)

(b) *Cyclohexylamine.*—The dienone (1.22 g.) and cyclohexylamine (1.51 g.) in dry ether (800 ml.) were irradiated for two hours. The excess of cyclohexylamine was removed as above and the reaction product isolated in the usual way. Recrystallisation from ether gave the cyclohexylamide of 6-acetoxyhepta-3,5-dienoic acid (1.55 g.), M.P. (white needles) 86.5–88°, $\lambda$ max., 237 m$\mu$.

($\epsilon=23,900$), infra-red bands (in $CCl_4$) at 3389 (secondary amide group), 1759 (enol acetate) and 1670 (cyclohexylamide carboxyl) $cm.^{-1}$. (Found: C, 67.85; H, 8.6; N, 5.3. $C_{15}H_{23}O_3N$ requires C, 67.9; H, 8.75; N, 5.3%.)

*Example V.—Irradiation of 6-Acetoxy-4,6-Dimethyl Cyclohexa-2,4-dien-1-one*

(a) The dienone (750 mg.) in anhydrous ether (750 ml.) containing cyclohexylamine (836 mg.) was irradiated for 4 hours. After removal of the cyclohexylamine with 3 N aqueous hydrochloric acid, the product was filtered in light petroleum through silica gel (15 g.) and then crystallised from light petroleum to give the cyclohexylamide of 6-acetoxy-4-methylhepta-2,5-dienoic acid (1.09 g.; 81%), M.P. 52–54°, and the absorption at 210 m$\mu$ ($\epsilon=4,500$), infra-red bands (in $CCl_4$) at 3379 (secondary amide group), 1749 (enol acetate), 16.78 (amide carboxyl) and 1225 (enol acetate) $cm.^{-1}$. (Found: C, 68.8; H, 8.9; N, 5.05. $C_{26}H_{23}O_3N$ requires C, 68.8; H, 9.0; N, 5.0%.)

*Example VI.—Irradiation of 6-Acetoxy-2,6-Dimethyl Cyclohexa-2,4-dien-1-one*

The dienone (635 mg.) in dry ether (635 ml.) containing cyclohexylamine (819 mg.) was irradiated for two hours. The excess of cyclohexylamine was removed as before and the product (in benzene) was filtered through silica gel (5 g.) to give the cyclohexylamide of 6-acetoxy-hepta-3,5-diene-2-carboxylic acid (906 mg.; 82%). Recrystallised from light petroleum B.P. 60–80°, this had M.P. 134–135°, $\lambda$ max. 238 m$\mu$ ($\epsilon=23,100$), infra-red bands at 3360 (secondary amide), 1755 (enol acetate) and 1672 (amide carbonyl) $cm.^{-1}$. (Found: C, 68.5; H, 9.2. $C_{16}H_{25}O_3N$ requires C, 68.8; H, 9.0%.)

*Example VII.—Irradiation of 6-Allyl-2,6-Dimethylcyclohexa-2,4-dien-1-one*

The crude dienone 18 (530 mg.) in dry ether (550 ml.) containing cyclohexylamine (3 ml.) was irradiated for 3 hours. Removal of excess cyclohexylamine and chromatography over alumina (Grade III; 350 g.) gave, on elution with light petroleum-ether (8:2) a main fraction having $\lambda$ max. 245 m$\mu$ ($\epsilon=18,000$). Rechromatography then furnished the cyclohexylamide of 6-methylnona-3,5,8-triene-2-carboxylic acid (216 mg.). Recrystallised from light petroleum this had M.P. 79–81°, $\lambda$ max. 245 m$\mu$ ($\epsilon=25,200$) infra-red bands (in $CCl_4$) at 3390 (secondary amide group), 1670 (amide carbonyl) and 910 and 990 (vinyl group) $cm.^{-1}$. (Found: C, 78.05; H, 10.2; N, 5.4. $C_{17}H_{27}ON$ requires C, 78.1; H, 10.4; N, 5.35%.)

*Example VIII.—Irradiation of 6-Acetoxy-2,4,6-Trimethylcyclohexa-2,4-dien-1-one*

The dienone (1.19 g.) in anhydrous ether (550 ml.) containing cyclohexylamine (1.19 g.) was irradiated for 2 hours. The solvent and excess of cyclohexylamine were removed in vacuo and the product filtered in light petroleum through silica gel (150 g.) to give the cyclohexylamide of 6-acetoxy-4-methylhepta-2,5-diene-2-carboxylic acid (1.51 g.; 84%). Recrystallised from light petroleum (998 mg.), this had M.P. 76–79°, $\lambda$ (shoulder) 219–225 m$\mu$ ($\epsilon=3,000$) infra-red bands (in $OCl_4$) at 3363 (secondary amide), 1745 (enol acetate), 1678 (amide carbonyl) and 1230 (enol acetate) $cm.^{-1}$. (Found: C, 69.4; H, 9.1; N, 4.8. $C_{17}H_{27}O_3N$ requires C, 69.6; H, 9.4; N, 4.75%.) This amide took up rapidly 1.9 mols. of hydrogen on microhydrogenation over platinium in ethyl acetate solution.

*Example IX.—Irradiation of 6-Allyl-2,4,6-Trimethyl-cyclohexa-2,4-Dien-1-one*

The dienone (2.84 g.) in anhydrous ether (500 ml.) containing cyclohexylamine (3 ml.) was irradiated for 13.5 hours. The excess of cyclohexylamine was removed as before to give an oil (2.88 g.). A portion (840 mg.) of this produce was chromatographed in light petroleum over acid silica gel. Elution with 5:1-light petroleum-ether gave the cyclohexylamide of 4,6-dimethylnona-2,5,7-triene-2-carboxylic acid (615 mg.; 83.5%) which crystallised on standing. Recrystallised in the cold from light petroleum this had M.P. 50–53°, $\lambda$ 210 m$\mu$ (end absorption) ($\epsilon=12,300$), infra-red bands (in $CCl_4$) at 3358 (secondary amide group), 1673 (amide carbonyl) and 916 and 982 (vinyl grouping) $cm.^{-1}$. (Found: C, 78.65; H, 10.3. $C_{13}H_{28}ON$ requires C, 78.8; H, 10.3%.)

We claim:

1. The process which comprises irradiating a cyclohexadienone of the formula

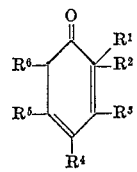

with ultra-violet light in the presence of a nucleophilic reagent selected from the group consisting of water, primary amines, secondary amines, alcohols and acids; $R^1$, $R^2$, $R^3$, $R^4$, $R^5$ and $R^6$ each being selected from the group consisting of hydrogen, halogen, alkyl, alkoxy, acyl, alkenyl, aralkyl, aralkenyl and aryl groups, no more than one of said $R^1$ and $R^2$ being hydrogen.

2. A process as defined in claim 1, wherein said nucleophilic reagent is water and including the step of separating a compound of the formulae

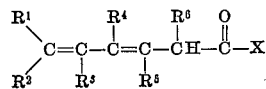

and

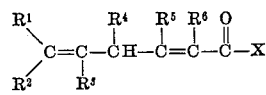

wherein X is hydroxyl.

3. A process as defined in claim 1, wherein said nucleophilic reagent is a primary amine, and including the step of separating an amide of said primary amine and an acid of the formulae

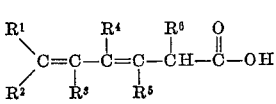

and

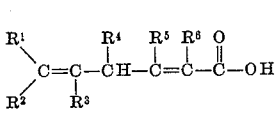

4. A process as defined in claim 1, in which the nucleophilic reagent is cyclohexylamine.

5. A process as defined in claim 1, in which the nucleophilic reagent is aniline.

6. A process as defined in claim 1, wherein the reaction is carried out in the presence of an inert solvent.

7. A process as defined in claim 1, in which the reaction is carried out in an atmosphere of an inert gas.

8. A process as defined in claim 1, wherein the wavelength of the ultra-violet radiation corresponds to that of the maximum absorption of the cyclohexadienone compound.

9. A process as defined in claim 1, wherein the wavelength of said radiation is between 250 and 500 m$\mu$.

10. A process as defined in claim 1, wherein the nucleophilic reagent is present in excess.

11. A process as defined in claim 1, wherein a dilute solution of said cyclohexadienone is irradiated.

12. A process as defined in claim 11, wherein said solution of cyclohexadienone contains approximately 0.1% of said cyclohexadienone.

References Cited in the file of this patent

UNITED STATES PATENTS

| | | |
|---|---|---|
| 2,783,258 | Celmer | Feb. 26, 1957 |
| 2,864,752 | Chalkley | Dec. 16, 1958 |
| 2,879,214 | Divine | Mar. 24, 1959 |

UNITED STATES PATENT OFFICE
CERTIFICATE OF CORRECTION

Patent No. 3,032,491                              May 1, 1962

Derek H. R. Barton

It is hereby certified that error appears in the above numbered patent requiring correction and that the said Letters Patent should read as corrected below.

Column 4, line 5, after "linkages" insert a closing parenthesis; line 66, after "group" insert a closing parenthesis; column 5, line 66, for "platnium" read -- platinum --; line 75, for "produce" read -- product --; column 6, lines 15 to 20, the formula should appear as shown below instead of as in the patent:

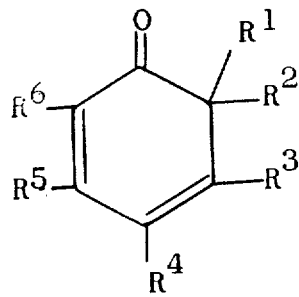

Signed and sealed this 29th day of January 1963.

(SEAL)
Attest:
ERNEST W. SWIDER
Attesting Officer

DAVID L. LADD
Commissioner of Patents